US012440854B2

(12) United States Patent
Yan et al.

(10) Patent No.: US 12,440,854 B2
(45) Date of Patent: Oct. 14, 2025

(54) MULTI-FUNCTION PULL-OUT SPRAY HEAD

(71) Applicant: Xiamen Forbetter Sanitary Ware Co., Ltd., Fujian (CN)

(72) Inventors: Xiliang Yan, Xiamen (CN); Yihui Chen, Xiamen (CN); Mouyong Lin, Xiamen (CN)

(73) Assignee: XIAMEN FORBETTER SANITARY WARE CO., LTD., Fujian (CN)

(*) Notice: Subject to any disclaimer, the term of this patent is extended or adjusted under 35 U.S.C. 154(b) by 504 days.

(21) Appl. No.: 17/903,056

(22) Filed: Sep. 6, 2022

(65) Prior Publication Data

US 2023/0072089 A1 Mar. 9, 2023

(30) Foreign Application Priority Data

Sep. 9, 2021 (CN) ........................ 202122180616.X

(51) Int. Cl.

*B05B 1/16* (2006.01)
*B05B 7/04* (2006.01)
*B05B 7/08* (2006.01)

(52) U.S. Cl.

CPC ............ *B05B 1/169* (2013.01); *B05B 7/0425* (2013.01); *B05B 7/08* (2013.01)

(58) Field of Classification Search

CPC ... B05B 1/16–169; B05B 1/12; B05B 1/1618; B05B 1/18; B05B 1/3013; B05B 1/1627; B05B 1/1636; B05B 1/1681; B05B 1/3026; B05B 1/14; B05B 1/1609; E03C 1/0404; E03C 1/0405; E03C 1/0412; E03C 2201/30; E03C 2001/0415; E03C 1/08; F16L 21/05; F16L 37/244

USPC ........................................... 239/390–397, 586

See application file for complete search history.

(56) References Cited

U.S. PATENT DOCUMENTS 2,770,476 A * 11/1956 Cleverly ................. F16L 21/05 264/DIG. 60
2004/0079426 A1 * 4/2004 Hung ...................... E03C 1/044 137/801
2004/0227014 A1 * 11/2004 Williams .............. E03C 1/0404 239/443
2007/0221757 A1 * 9/2007 Malek ................... B05B 12/002 239/447

* cited by examiner

*Primary Examiner* — Arthur O. Hall
*Assistant Examiner* — Juan C Barrera
(74) *Attorney, Agent, or Firm* — Birchwood IP

(57) ABSTRACT

A multi-function pull-out spray head includes a housing, a switching assembly, and a water discharge assembly. The water discharge assembly forms at least three water outlet areas. The switching assembly includes a first inner body, a second inner body, a first switching control unit, and at least two second switching control units. The first inner body has a communicating flow passage made by core-pulling technology in a direction parallel to a water flowing direction. The multi-function pull-out spray head is not easy to leak water and has the characteristics of high yield.

20 Claims, 14 Drawing Sheets

MULTI-FUNCTION PULL-OUT SPRAY HEAD

BACKGROUND OF THE INVENTION

1. Field of the Invention

The present invention relates to sanitary wares, and more particularly, to a multi-function pull-out spray head that is designed for easy maintenance.

2. Description of the Prior Art

A conventional multi-function pull-out spray head has a switching assembly to achieve at least three different spray modes. The inner body of the switching assembly has water chambers and a communicating flow passage formed by side core-pulling technology. The communicating flow passage communicates with the two water chambers. Then, a sealing plate is welded on the side of the inner body of the switching assembly to close the core-pulling opening on the side of the inner body of the switching assembly. The conventional multi-function pull-out spray head has the defects of water leakage and low yield.

SUMMARY OF THE INVENTION

The primary object of the present invention is to provide a multi-function pull-out spray head that is designed for easy maintenance. The multi-function pull-out spray head is not easy to leak water and has the characteristics of high yield.

In order to achieve the above object, the present invention adopts the following technical solutions.

A multi-function pull-out spray head comprises a housing, a switching assembly, and a water discharge assembly. The switching assembly is mounted in the housing. The water discharge assembly is mounted to the housing. The water discharge assembly forms at least three water outlet areas. The water discharge assembly is connected to an outlet end of the switching assembly. The switching assembly includes a first inner body, a second inner body, a first switching control unit, and at least two second switching control units. At least three outlet flow passages are formed between the first inner body and an inside of the second inner body. The second inner body is detachably connected to the first inner body in a sealing manner. The first switching control unit controls water to flow into the first inner body. The second switching control units each controls water flowing into the first inner body to selectively flow out to a corresponding one of the water outlet areas along at least one of the outlet flow passages. The first inner body has a communicating flow passage made by core-pulling technology in a direction parallel to a water flowing direction.

One end of the first inner body forms an inlet end. The communicating flow passage is made by core-pulling technology along the water flowing direction. An end face of another end of the first inner body is formed with a core-pulling hole. The core-pulling hole is sealed and blocked by a block.

Alternatively, one end of the first inner body forms an inlet end. The communicating flow passage is made by core-pulling technology in opposition to the water flowing direction. A core-pulling hole is formed in the inlet end. The core-pulling hole is sealed and blocked by a rubber pad.

The number of the water outlet areas is three, the number of the second switching control units is two, and the number of the outlet flow passages is three. The second switching control units each control water flowing into the first inner body to selectively flow out to the corresponding water outlet area along one of the outlet flow passages.

The end face of the another end of the first inner body is formed with a first diversion hole and a second diversion hole. A first water chamber and a second water chamber are formed in the first inner body. The first switching control unit is accommodated in the first water chamber. The inlet end communicates with the first water chamber. The first switching control unit selectively controls the second water chamber to communicate with the first water chamber. One of the second switching control units is accommodated in the second water chamber and selectively controls the second water chamber to communicate with the first diversion hole or the second diversion hole. The water outlet areas are defined as a first water outlet area, a second water outlet area, and a third water outlet area. The outlet flow passages are defined as a first outlet flow passage, a second outlet flow passage, and a third outlet flow passage. The second inner body forms a third water chamber, a first inlet flow passage, the first outlet flow passage, the second outlet flow passage, and the third outlet flow passage. The first inlet flow passage communicates with the third water chamber and the first diversion hole. The other second switching control unit is accommodated in the third water chamber. The first outlet flow passage communicates with the second diversion hole and the first water outlet area. The other second switching control unit selectively controls the third water chamber to communicate with the second outlet flow passage or the third outlet flow passage. The second outlet flow passage communicates with the second water outlet area. The third outlet flow passage communicates with the third water outlet area.

A first receiving groove and a second receiving groove are formed in the end face of the another end of the first inner body. The first receiving groove surrounds the first diversion hole. The second receiving groove surrounds the second diversion hole. A first positioning ring and a second positioning ring protrude from an end face of the second inner body, facing the first inner body. The first positioning ring is aligned with and received in the first receiving groove. The second positioning ring is aligned with and received in the second receiving groove. Sealing rings are disposed between the first positioning ring and the first receiving groove and between the second positioning ring and the second receiving groove. The sealing rings are O-shaped rings.

The first switching control unit includes a pause fastening ring, a pause shaft, a first spring, and a first button. The pause fastening ring is fixed to an upper end of the first water chamber. The pause shaft is movably inserted through the pause fastening ring to be moved up and down. One end of the first spring is accommodated in the pause shaft. Another end of the first spring abuts against a bottom of the first water chamber. Sealing rings are disposed at a lower end of the pause shaft, between the pause shaft and the pause fastening ring and between the pause fastening ring and a wall of the first water chamber, respectively. The communicating flow passage is disposed between the first water chamber and the second water chamber. The first button cooperates with an upper end of the pause shaft. The sealing ring at the lower end of the pause shaft selectively closes one end of the communicating flow passage located in the first water chamber, so that the first water chamber selectively communicates with the second water chamber.

The second switching control unit includes a switching shaft, a switching fastening ring, a washer, a first rubber gasket, and a second spring. The switching shaft is movably inserted through the switching fastening ring to be moved up and down. A protrudent ring is disposed on a circumferential wall of the switching shaft. The second spring is disposed between the protrudent ring and a lower surface of the switching fastening ring. The switching fastening ring of the one of the second switching control units is fixed to an upper end of the second water chamber. The switching fastening ring of the other second switching control units is fixed to an upper end of the third water chamber. Sealing rings are disposed between the switching fastening ring of the one of the second switching control units and the second water chamber and between the switching fastening ring of the other second switching control unit and the third water chamber. The washer is disposed between the switching shaft and the switching fastening ring. The first rubber gasket is fitted on the protrudent ring. A first branch flow passage is formed between the second water chamber and the first diversion hole. A second branch flow passage is formed between the second water chamber and the second diversion hole. The first rubber gasket of the one of the second switching control units selectively blocks the first branch flow passage or the second branch flow passage. The first rubber gasket of the other second switching control unit selectively blocks the second outlet flow passage or the third outlet flow passage.

The multi-function pull-out spray head further comprises a switching button, a first pull buckle, a second pull buckle, and a third spring. A pivot seat is formed above a junction of the first inner body and the second inner body. A pivot shaft passes through the pivot seat. A protrudent portion is formed on an upper end of the switching shaft of the second switching control unit. The third spring is disposed between the protrudent portion of the other second switching control unit and an inner wall of the switching button. One end of the first pull buckle is connected to the pivot shaft. One end of the second pull buckle is connected to the pivot shaft. A lower middle of the switching button is connected to the pivot shaft. The switching shafts of the second switching control units are moved up and down by the first pull buckle and the second pull buckle, respectively. The switching button is linked to the first pull buckle and the second pull buckle.

The water discharge assembly includes a filter screen, a second rubber gasket, an aerator, a locking ring, and a base. The locking ring locks the aerator to a middle portion of the base. The second rubber gasket is disposed between the locking ring and the base. The base is formed with the first water outlet area and the second water outlet area. The aerator is formed with the third water outlet area. The filter screen is aligned with the first water outlet area. The filter screen is disposed between the second inner body and the base. The base is detachably connected to the second inner body. Sealing rings are disposed between the base and the second inner body and between an outlet of the first outlet flow passage and an outlet of the third outlet flow passage.

A sealing ring is disposed between the first inner body and the second inner body. The first inner body and the second inner body are connected together with screws.

A one-way valve is accommodated in the inlet end. The one-way valve holds the rubber pad.

The rubber pad is connected to the inlet end in a snap-fit manner.

One end of the first inner body forms an inlet end. The communicating flow passage is made by core-pulling technology in opposition to the water flowing direction. A core-pulling hole is formed in the inlet end. The core-pulling hole is sealed and blocked by a rubber pad. The inlet end has an engaging portion. The rubber pad has an engaging groove. The engaging portion is engaged in the engaging groove.

With the above technical solutions, the first inner body of the present invention has the communicating flow passage made by core-pulling technology in a direction parallel to a water flowing direction. The sides of the first inner body and the second inner body of the present invention do not have core-pulling openings that need to be sealed and blocked with sealing plates. The core-pulling hole of the communicating flow passage in the first inner body of the present invention is formed in the water flowing direction, so that the first inner body and the second inner body of the present invention are not easy to leak water. The yield of products of the present invention is improved. In the present invention, the first inner body and the second inner body are detachably connected. When the first inner body or the second inner body fails, they can be disassembled for inspection and maintenance. The multi-function pull-out spray head provided by the present invention is designed for easy maintenance.

DETAILED DESCRIPTION OF THE PREFERRED EMBODIMENTS

Figure 1:
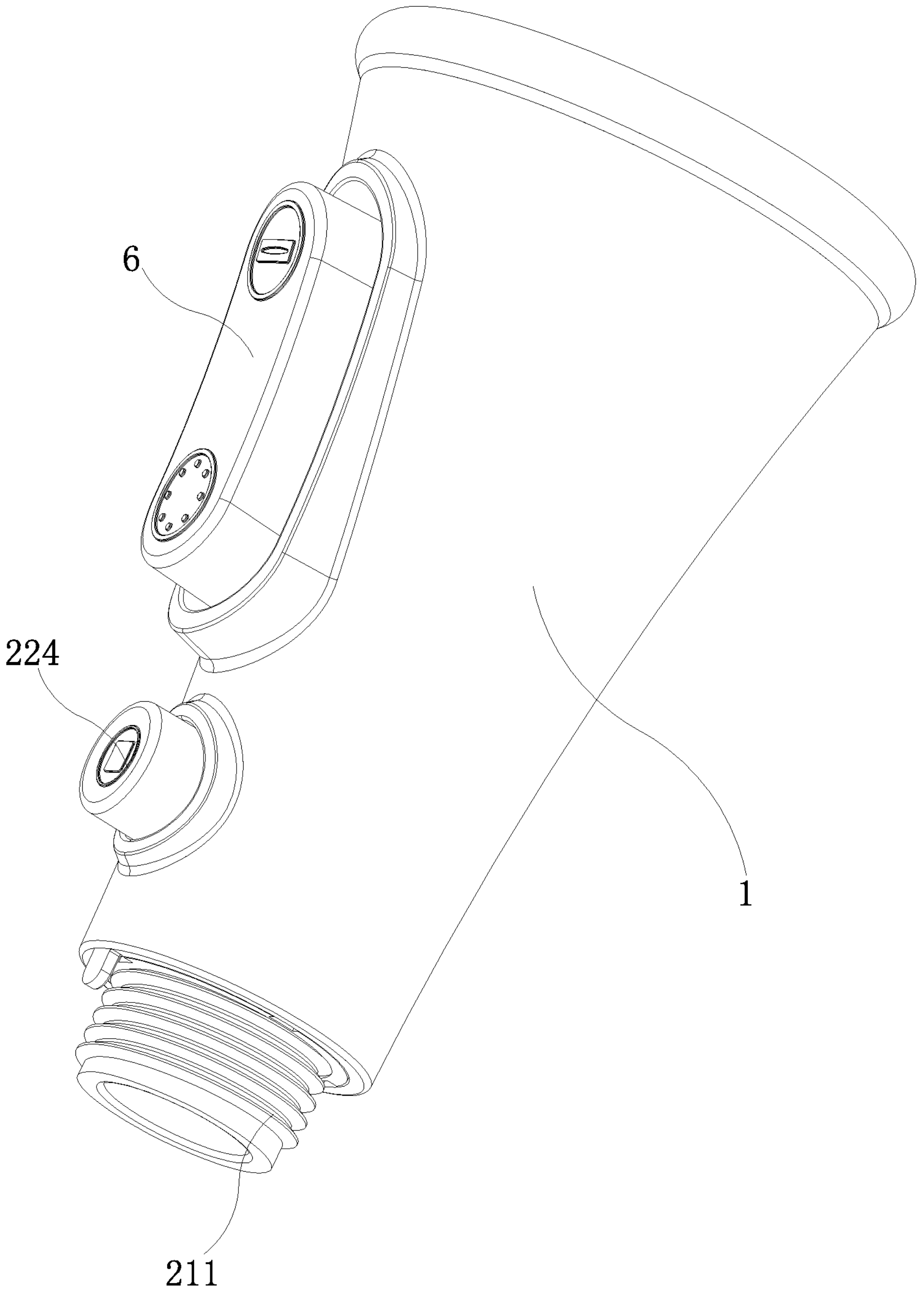
FIG. 1 is a perspective view of the present invention.

Embodiments of the present invention will now be described, by way of example only, with reference to the accompanying drawings.

Referring to FIGS. 1 to 11, the present invention discloses a multi-function pull-out spray head that is designed for easy maintenance. The multi-function pull-out spray head comprises a housing 1, a switching assembly 2, and a water discharge assembly 3. The switching assembly 2 is mounted in the housing 1. The water discharge assembly 3 is mounted to the housing 1. The water discharge assembly 3 forms at least three water outlet areas. The water discharge assembly 3 is connected to an outlet end of the switching assembly 2. The switching assembly 2 includes a first inner body 2101, a second inner body 2102, a first switching control unit 22, and at least two second switching control units 23. At least three outlet flow passages are formed between the first inner body 2101 and the inside of the second inner body 2102. The second inner body 2102 is detachably connected to the first inner body 2101 in a sealing manner. The first switching control unit 22 controls water to flow into the first inner body 2101. The second switching control units 23 each control water flowing into the first inner body 2101 to selectively flow out to the corresponding water outlet area along at least one of the outlet flow passages. The first inner body 2101 has a communicating flow passage 203 made by core-pulling technology in a direction parallel to a water flowing direction.

Therefore, in the present invention, the first inner body 2101 has the communicating flow passage 203 made by core-pulling technology in a direction parallel to the water flowing direction. The sides of the first inner body 2101 and the second inner body 2102 of the present invention do not have core-pulling openings that need to be sealed and blocked with sealing plates. The core-pulling hole of the communicating flow passage in the first inner body 2101 of the present invention is formed in the water flowing direction, so that the first inner body 2101 and the second inner body 2102 of the present invention are not easy to leak water. The yield of products of the present invention is improved. In the present invention, the first inner body 2101 and the second inner body 2102 are detachably connected. When the first inner body 2101 or the second inner body 2102 fails, they can be disassembled for inspection and maintenance. The multi-function pull-out spray head provided by the present invention is designed for easy maintenance. In the present invention, the first inner body 2101 is made by core-pulling technology in a direction parallel to the water flowing direction. The shape and size and the water flow passages of the product provided by the present invention are consistent with the shape and size and the water flow passages of the existing pull-out spray head made by side core-pulling technology. The core-pulling hole of the first inner body 2101 of the present invention can be sealed and blocked.

In this embodiment, the number of the water outlet areas is three. The number of the second switching control units 23 is two. The number of the outlet flow passages is three. The second switching control units 23 each control water flowing into the first inner body 2101 to selectively flow out to the corresponding water outlet area along one of the outlet flow passages, but not limited thereto.

Furthermore, in order to facilitate the disassembly and assembly of the first inner body 2101 and the second inner body 2102, a sealing ring 5 is disposed between the first inner body 2101 and the second inner body 2102. The first inner body 2101 and the second inner body 2102 are connected together with screws 9.

Further, in order to simplify the structure of the present invention, one end of the first inner body 2101 forms an inlet end 211. A first diversion hole 212 and a second diversion hole 213 are formed on the end face of the other end of the first inner body 2101. A first water chamber 214 and a second water chamber 215 are formed in the first inner body 2101. The first switching control unit 22 is accommodated in the first water chamber 214. The inlet end 211 communicates with the first water chamber 214. The first switching control unit 22 selectively controls the second water chamber 215 to communicate with the first water chamber 214. One of the second switching control units 23 is accommodated in the second water chamber 215 and selectively controls the second water chamber 215 to communicate with the first diversion hole 212 or the second diversion hole 213. The water outlet areas are defined as a first water outlet area 31, a second water outlet area 32 and a third water outlet area 33. The outlet flow passages are defined as a first outlet flow passage 217, a second outlet flow passage 218 and a third outlet flow passage 219. The second inner body 2102 forms a third water chamber 216, a first inlet flow passage 201, the first outlet flow passage 217, the second outlet flow passage 218 and the third outlet flow passage 219. The first inlet flow passage 201 communicates with the third water chamber 216 and the first diversion hole 212. The other second switching control unit 23 is accommodated in the third water chamber 216. The first outlet flow passage 217 communicates with the second diversion hole 213 and the first water outlet area 31. The other second switching control unit 23 selectively controls the third water chamber 216 to communicate with the second outlet flow passage 218 or the third outlet flow passage 219. The second outlet flow passage 218 communicates with the second water outlet area 32. The third outlet flow passage 219 communicates with the third water outlet area 33. A retaining ring 10 is threadedly connected to the inlet end 211. The retaining ring 10 is fastened to the end of the housing 1 away from the water discharge assembly 3, so that the inlet end 211 is retained and extends out of the housing 1.

Next, the first switching control unit 22 includes a pause fastening ring 221, a pause shaft 222, a first spring 223, and a first button 224. The pause fastening ring 221 is fixed to the upper end of the first water chamber 214. The pause shaft 222 is movably inserted through the pause fastening ring 221 to be moved up and down. One end of the first spring 223 is accommodated in the pause shaft 222, and the other end of the first spring 223 abuts against the bottom of the first water chamber 214. Sealing rings 5 are respectively disposed at the lower end of the pause shaft 222, between the pause shaft 222 and the pause fastening ring 221 and between the pause fastening ring 221 and the wall of the first water chamber 214. The communicating flow passage 203 is disposed between the first water chamber 214 and the second water chamber 215. The first button 224 cooperates with the upper end of the pause shaft 222. The sealing ring 5 at the lower end of the pause shaft 222 selectively closes the end of the communicating flow passage 203 located in the first water chamber 214, so that the first water chamber 214 selectively communicates with the second water chamber 215. The first button 224 extends out of the housing 1.

In addition, in order to facilitate the second switching control unit 23 to control water to be discharged, the second switching control unit 23 includes a switching shaft 231, a switching fastening ring 232, a washer 233, a first rubber gasket 234, and a second spring 235. The switching shaft 231 is movably inserted through the switching fastening ring 232 to be moved up and down. A protrudent ring 2311 is disposed on the circumferential wall of the switching shaft 231. The second spring 235 is disposed between the protrudent ring 2311 and the lower surface of the switching fastening ring 232. The switching fastening ring 232 of one of the second switching control units 23 is fixed to the upper end of the second water chamber 215. The switching fastening ring 232 of the other second switching control units 23 is fixed to the upper end of the third water chamber 216.

Sealing rings 5 are disposed between the switching fastening ring 232 of one of the second switching control units 23 and the second water chamber 215 and between the switching fastening ring 232 of the other second switching control unit 23 and the third water chamber 216. The washer 233 is disposed between the switching shaft 231 and the switching fastening ring 232. The first rubber gasket 234 is fitted on the protrudent ring 2311. A first branch flow passage 204 is formed between the second water chamber 215 and the first diversion hole 212. A second branch flow passage 205 is formed between the second water chamber 215 and the second diversion hole 213. The first rubber gasket 234 of one of the second switching control units 23 selectively blocks the first branch flow passage 204 or the second branch flow passage 205. The first rubber gasket 234 of the other second switching control unit 23 selectively blocks the second outlet flow passage 218 or the third outlet flow passage 219.

In order to facilitate the control of the two second switching control units 23, the present invention may further comprises a switching button 6, a first pull buckle 71, a second pull buckle 72, and a third spring 8. A pivot seat 206 is formed above the junction of the first inner body 2101 and the second inner body 2102. A pivot shaft 207 passes through the pivot seat 206. A protrudent portion 2312 is formed on the upper end of the switching shaft 231 of the second switching control unit 23. The third spring 8 is disposed between the protrudent portion 2312 of the other second switching control unit 23 and the inner wall of the switching button 6. The end of the first pull buckle 71 is connected to the pivot shaft 207. The end of the second pull buckle 72 is connected to the pivot shaft 207. The lower middle of the switching button 6 is connected to the pivot shaft 207. The switching shafts 231 of the second switching control units 23 are moved up and down by the first pull buckle 71 and the second pull buckle 72, respectively. The switching button 6 is linked to the first pull buckle 71 and the second pull buckle 72. The switching button 6 extends out of the housing 1. The upper end of the first pull buckle 71 and the upper end of the second pull buckle 72 are connected to the flanges of the inner wall of the switching button 6 in a snap-fit manner. The lower end of the first pull buckle 71 and the lower end of the second pull buckle 72 are connected below the protrudent portions 2312 of the switching shafts 231 of the second switching control units 23 in a snap-fit manner.

Further, in order to simplify the structure of the present invention, the water discharge assembly 3 includes a filter screen 34, a second rubber gasket 35, an aerator 36, a locking ring 37, and a base 38. The locking ring 37 locks the aerator 36 to the middle portion of the base 38. The second rubber gasket 35 is disposed between the locking ring 37 and the base 38. The base 38 is formed with the first water outlet area 31 and the second water outlet area 32. The aerator 36 is formed with the third water outlet area 33. The filter screen 34 is aligned with the first water outlet area 31. The filter screen 34 is disposed between the second inner body 2102 and the base 38. The base 38 is detachably connected to the second inner body 2102. Sealing rings 5 are disposed between the base 38 and the second inner body 2102 and between the outlet of the first outlet flow passage 217 and the outlet of the third outlet flow passage 219. The base 38 is detachably connected to the housing 1.

With the above structure, in the present invention, the first switching control unit 22 controls water in the first water chamber 214 to flow to the second water chamber 215 via the communicating flow passage 203. One of the second switching control units 23 controls water to flow from the second water chamber 215 to the third water chamber 212 or the first outlet flow passage 218. The other second switching control unit 23 controls water to flow from the third water chamber 216 to the second outlet flow passage 218 or the third outlet flow passage 219. The switching button 6 is configured to control the first switching control unit 22 and the second switching control units 23 for switching three different spray modes of the present invention, so as to meet different needs of the user.

Figure 2:
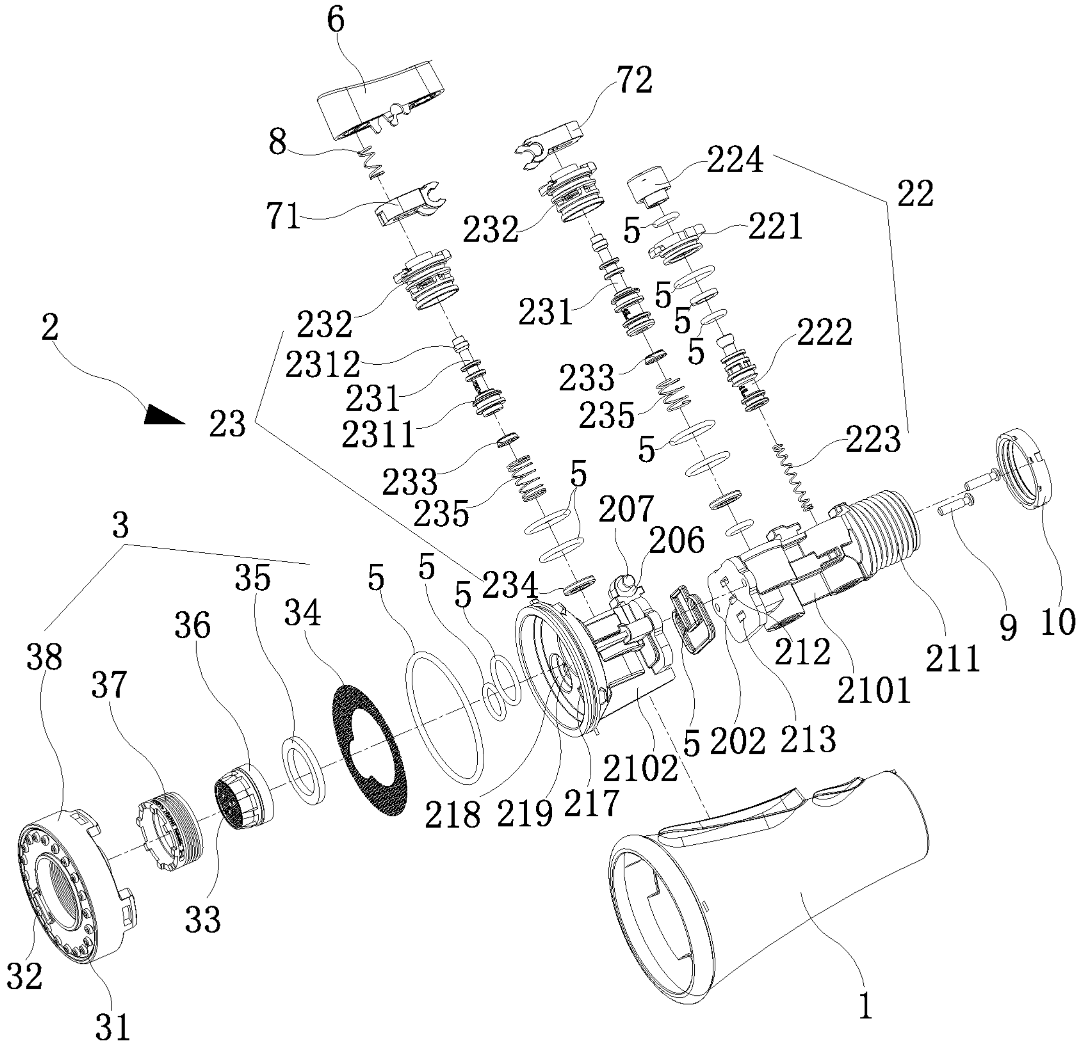
FIG. 2 is an exploded view of a first embodiment of the present invention.
Figure 2A:
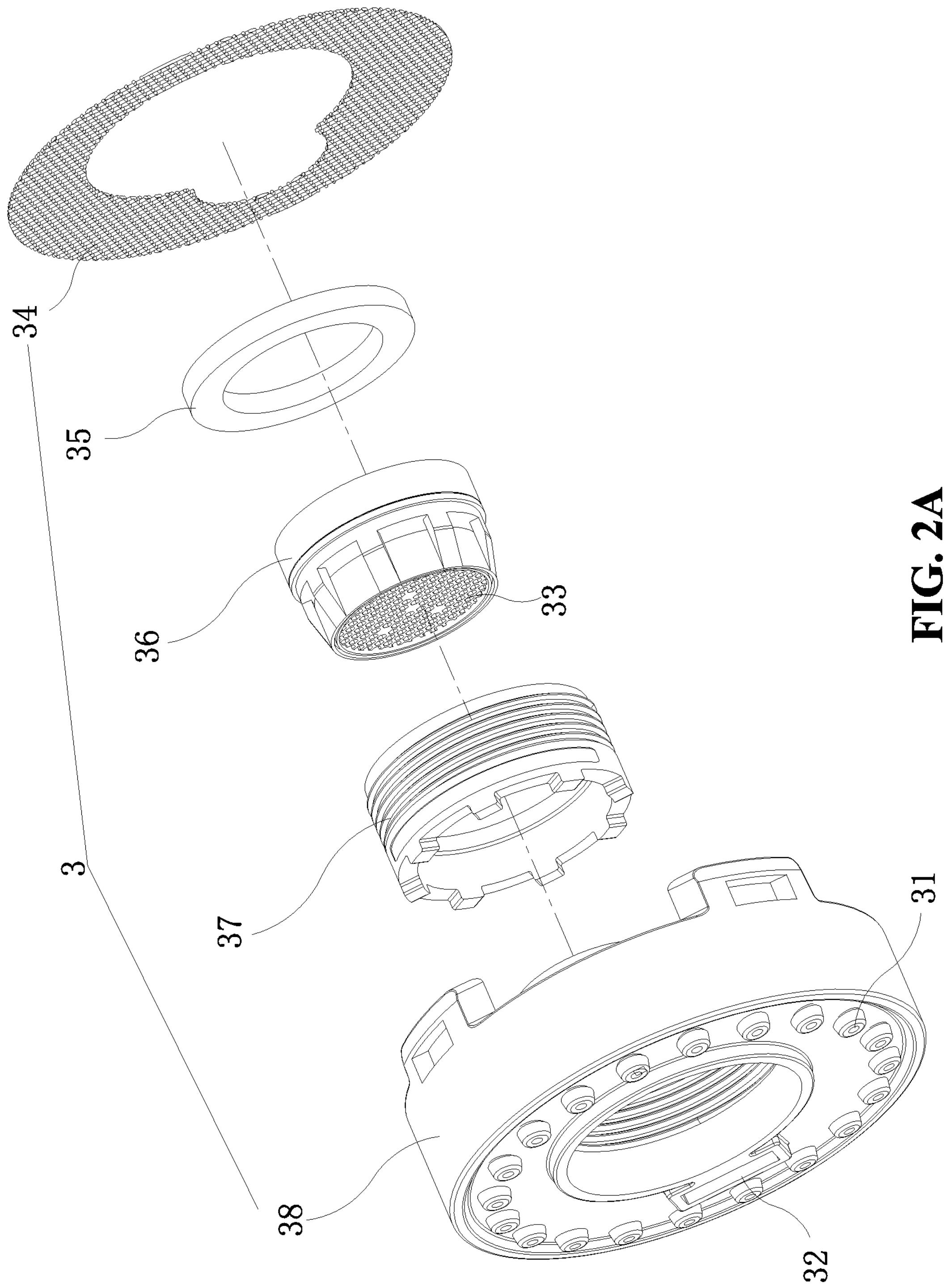
FIG. 2A is an exploded view of the water discharge assembly of the first embodiment of the present invention.
Figure 3:
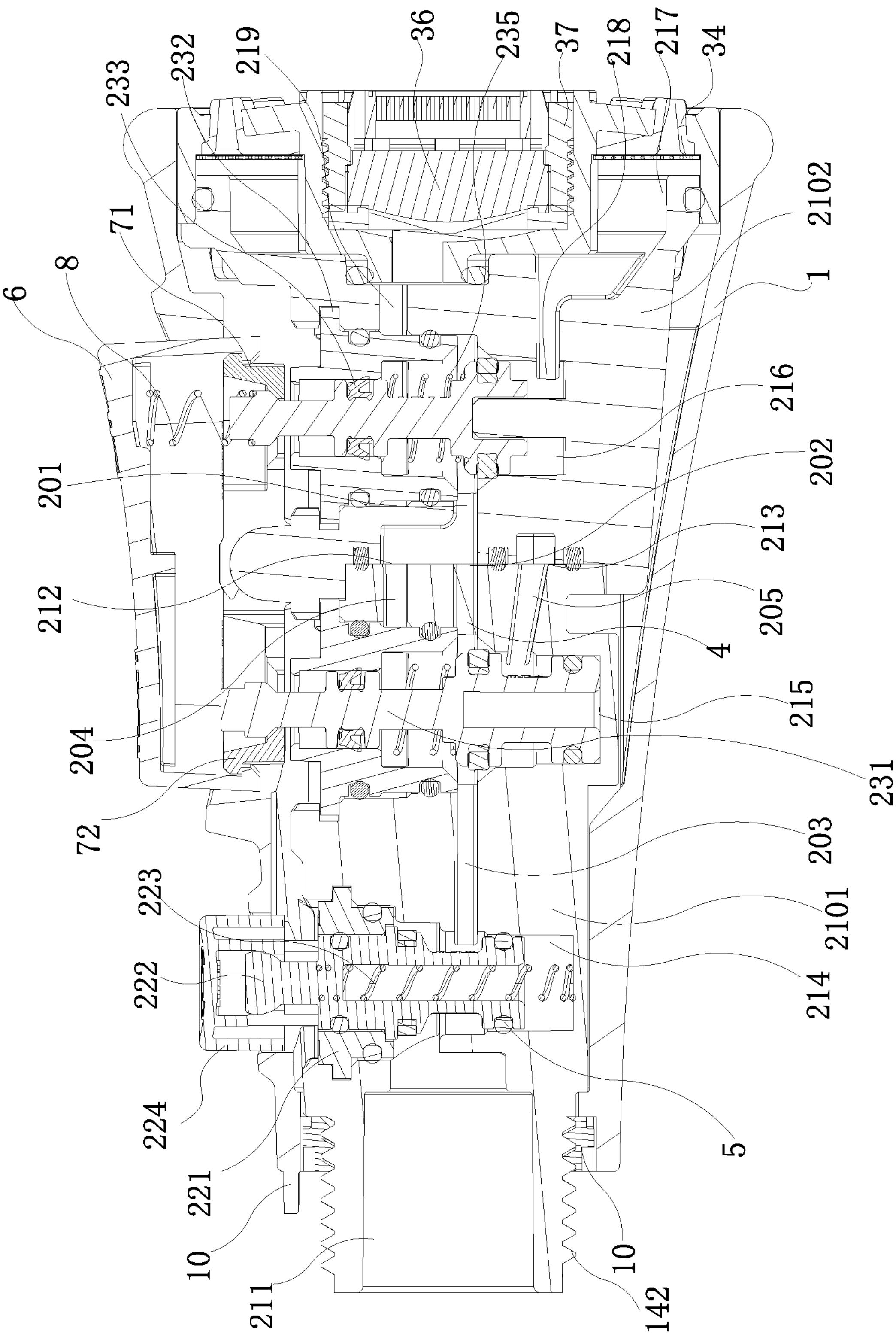
FIG. 3 is a cross-sectional view of the first embodiment of the present invention.
Figure 4:
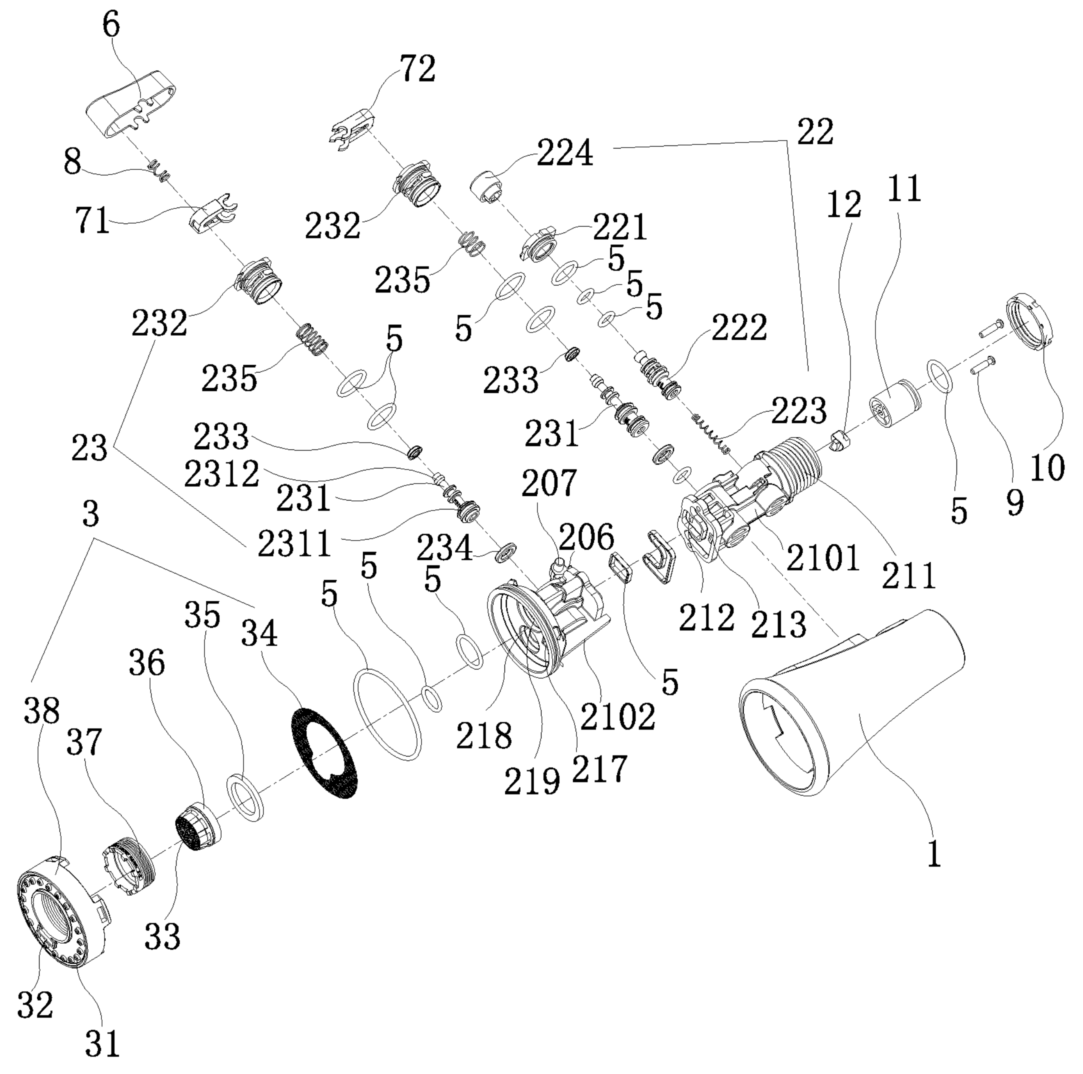
FIG. 4 is an exploded view of a second embodiment of the present invention.
Figure 4A:
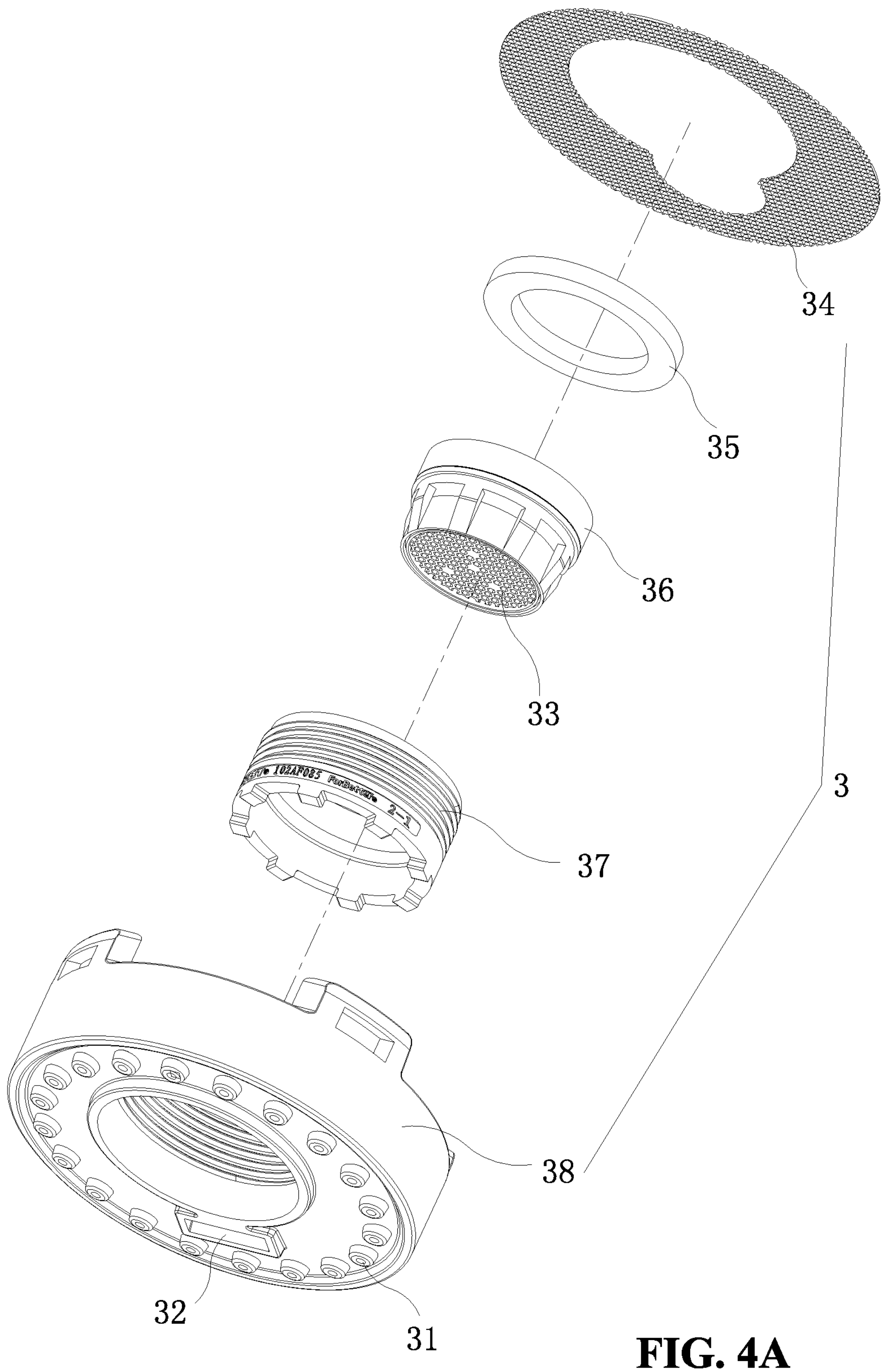
FIG. 4A is an exploded view of the water discharge assembly of the second embodiment of the present invention.
Figure 5:
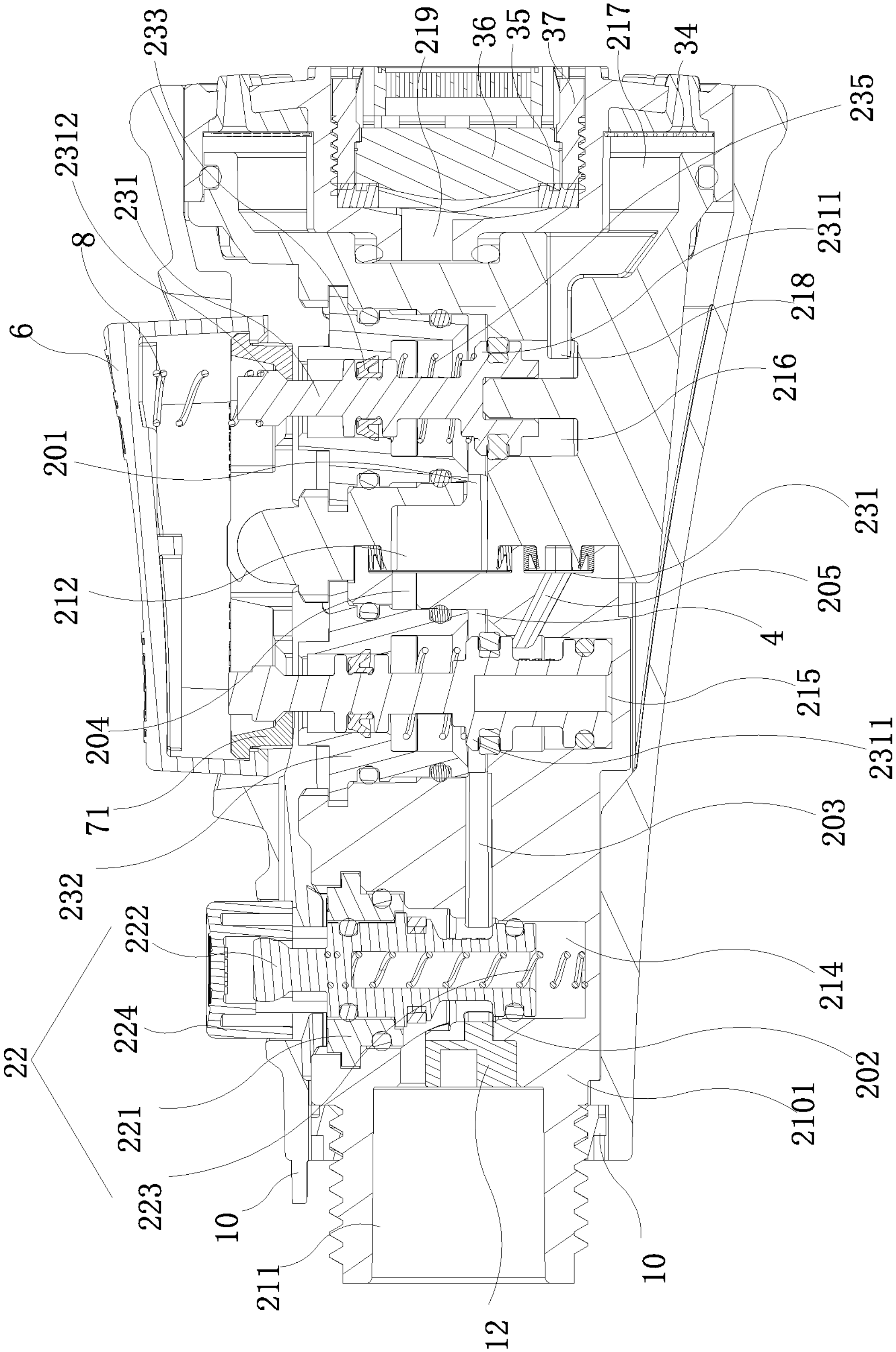
FIG. 5 is a cross-sectional view of the second embodiment of the present invention, without the one-way valve.
Figure 6:
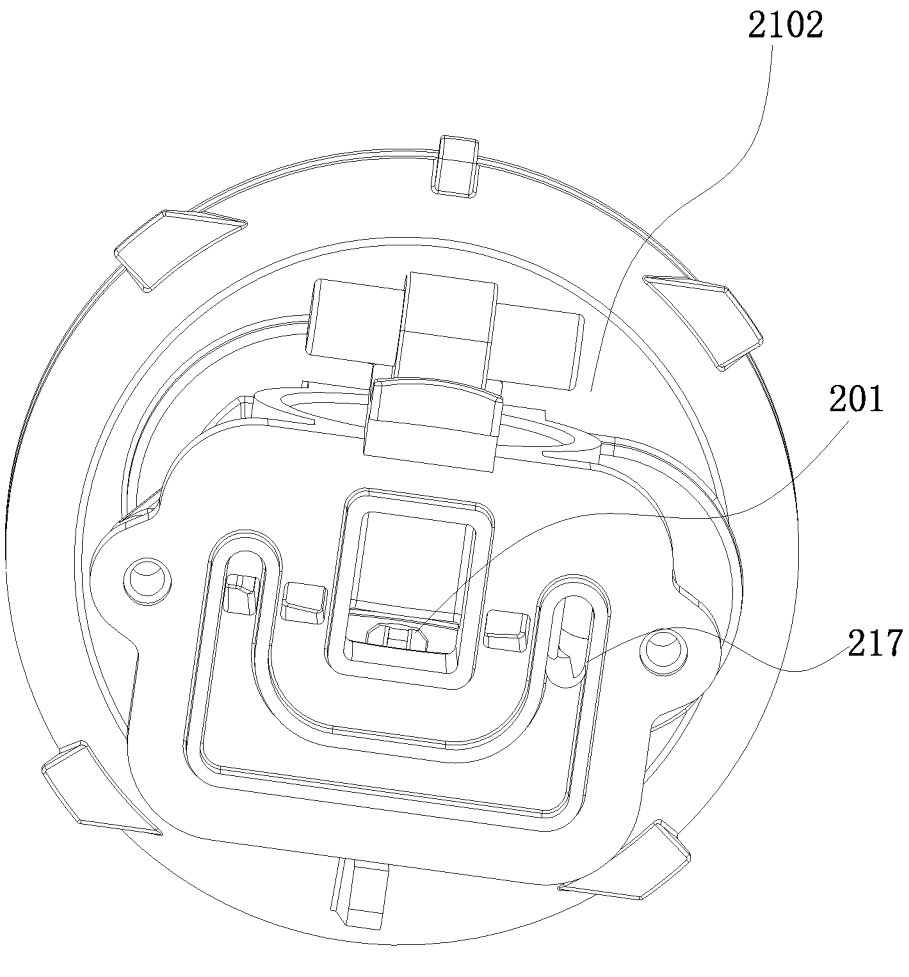
FIG. 6 is a rear view of the second inner body assembled with the water discharge assembly.

FIG. 2 and FIG. 3 illustrate a first embodiment of the present invention. FIG. 4 and FIG. 5 illustrate a second embodiment of the present invention. In the first embodiment, the communicating flow passage 203 is disposed. One end of the first inner body 2101 forms an inlet end 211. The first inner body 2101 is formed with the communicating flow passage 203. The communicating flow passage 203 is made by core-pulling technology along the water flowing direction. A core-pulling hole 202 is formed on the end face of the other end of the first inner body 2101. The core-pulling hole 202 is located between the first diversion hole 212 and the second diversion hole 213. The core-pulling hole 202 is sealed and blocked by a block 4. The core-pulling hole 202 and the communicating flow passage 203 are located on the same straight line. The core-pulling hole 202 is aligned with and communicates with the first inlet flow passage 201, so that when the core-pulling hole 202 leaks water, the water can flow into the first inlet flow passage 201 to prevent water leakage. In the second embodiment, the communicating flow passage 203 is disposed. One end of the first inner body 2101 forms an inlet end 211. The first inner body 2101 is formed with the communicating flow passage 203. The communicating flow passage 203 is made by core-pulling technology in opposition to the water flowing direction. A core-pulling hole 202 is formed in the inlet end 211. The core-pulling hole 202 is sealed and blocked by a rubber pad 12. The core-pulling hole 202 is aligned with and communicates with the first water chamber 214. When the core-pulling hole 202 leaks water, the water can flow into the first water chamber 214 to prevent water leakage. A one-way valve 11 is accommodated in the inlet end 211. The one-way valve 11 holds the rubber pad 12. A sealing ring 5 is disposed between the one-way valve 11 and the inner wall of the inlet end 211. With the technical solution of the second embodiment of the present invention, when water flows into the inlet end 211, water will impact the rubber pad 12, giving the rubber pad 12 a continuous pressure, so that the rubber pad 12 blocks the core-pulling hole 202 more tightly. The sealing effect is better.

Figure 7:
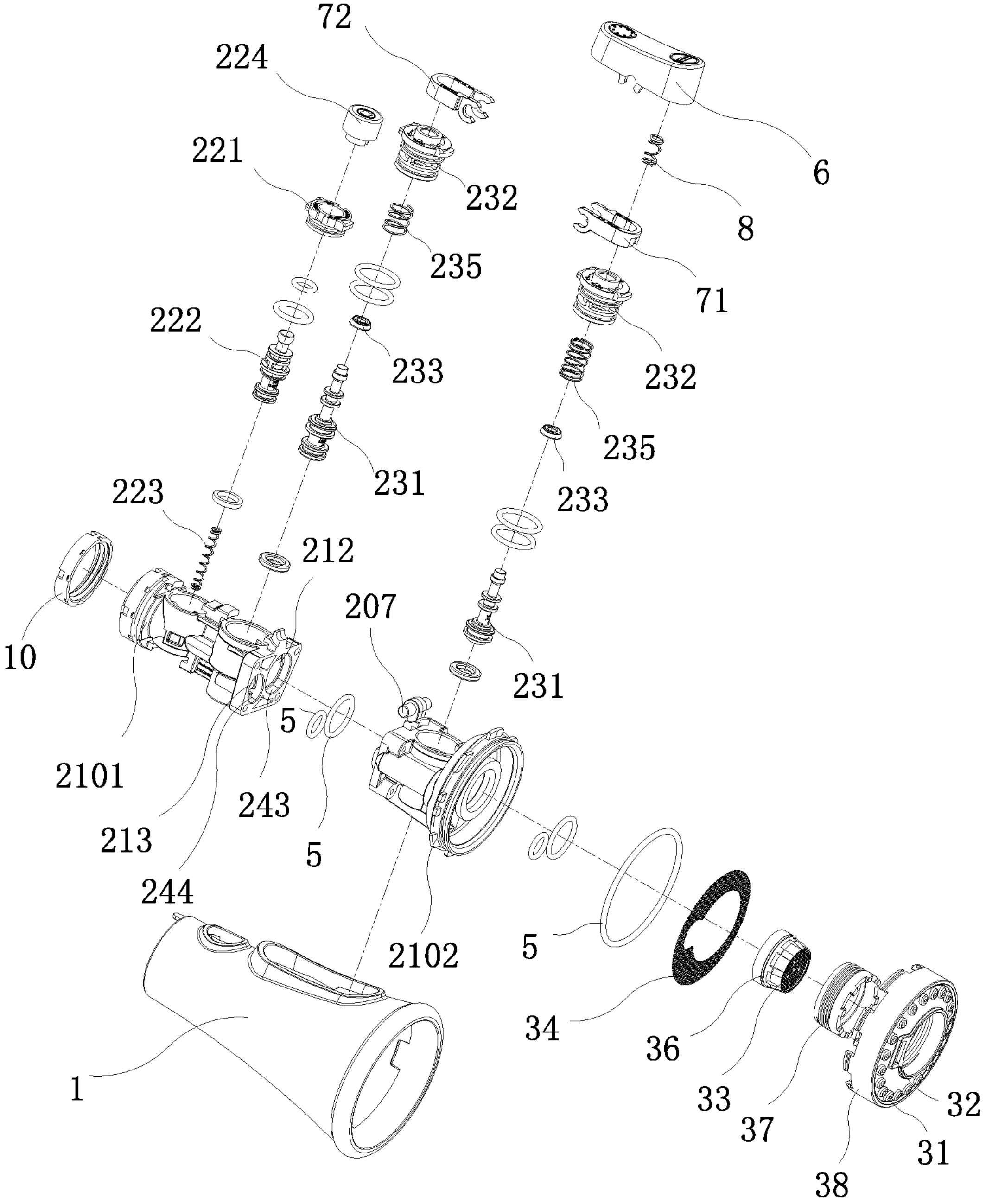
FIG. 7 is an exploded view of a third embodiment of the present invention.
Figure 7A:
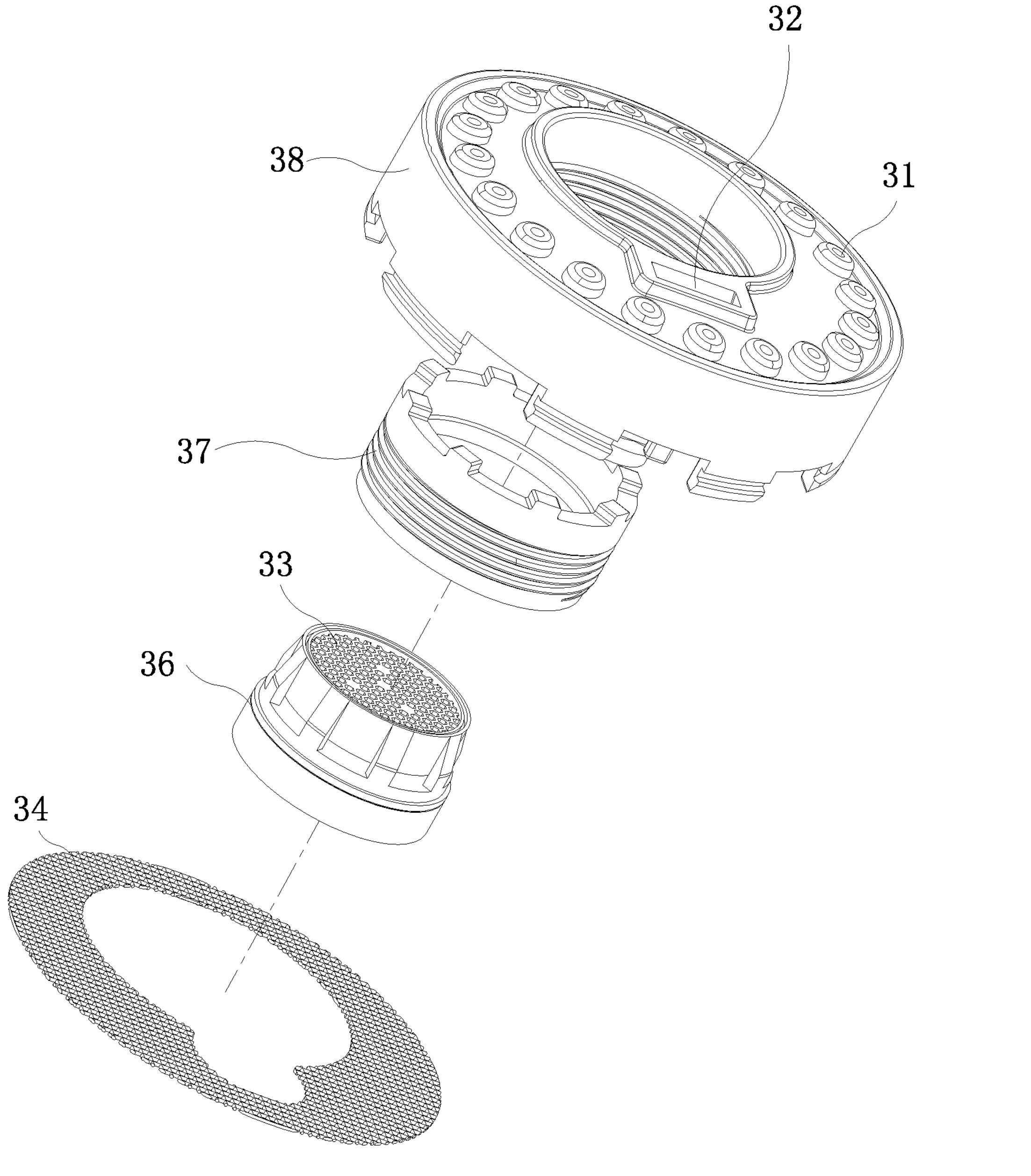
FIG. 7A is an exploded view of the water discharge assembly of the third embodiment of the present invention.
Figure 8:
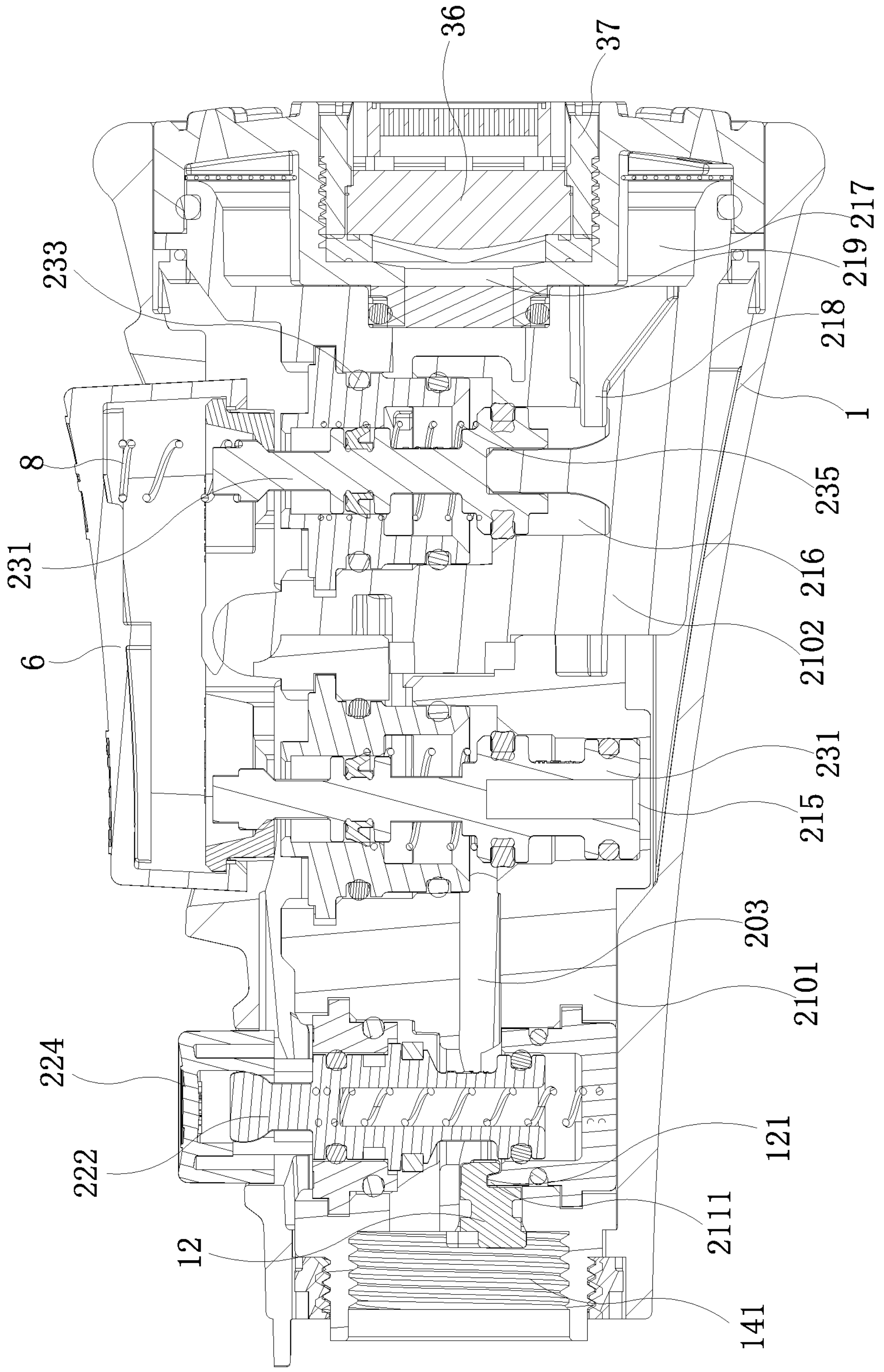
FIG. 8 is a cross-sectional view of the third embodiment of the present invention.
Figure 9:
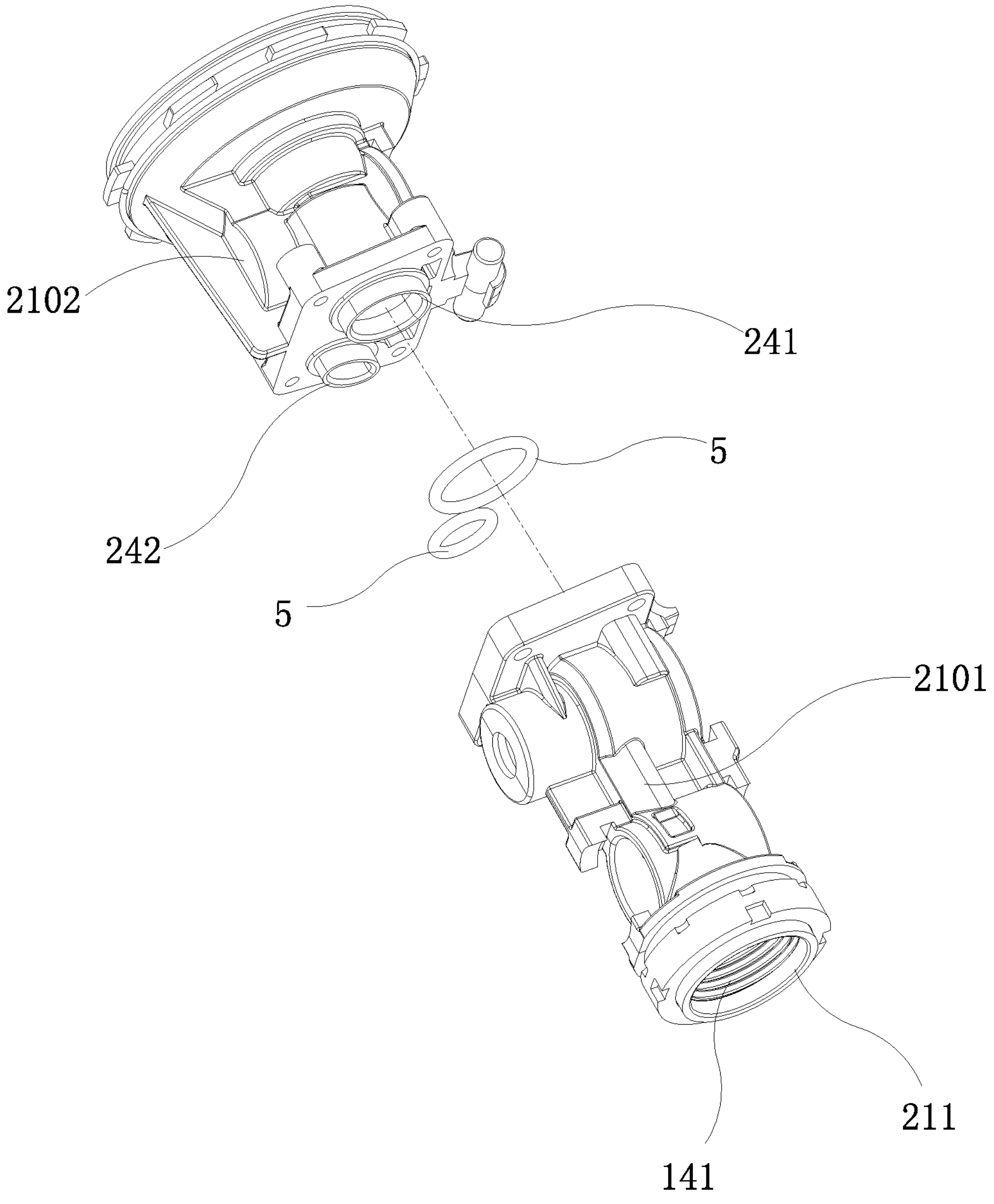
FIG. 9 is a schematic view of the first inner body and the second inner body according to the third embodiment of the present invention.
Figure 10:
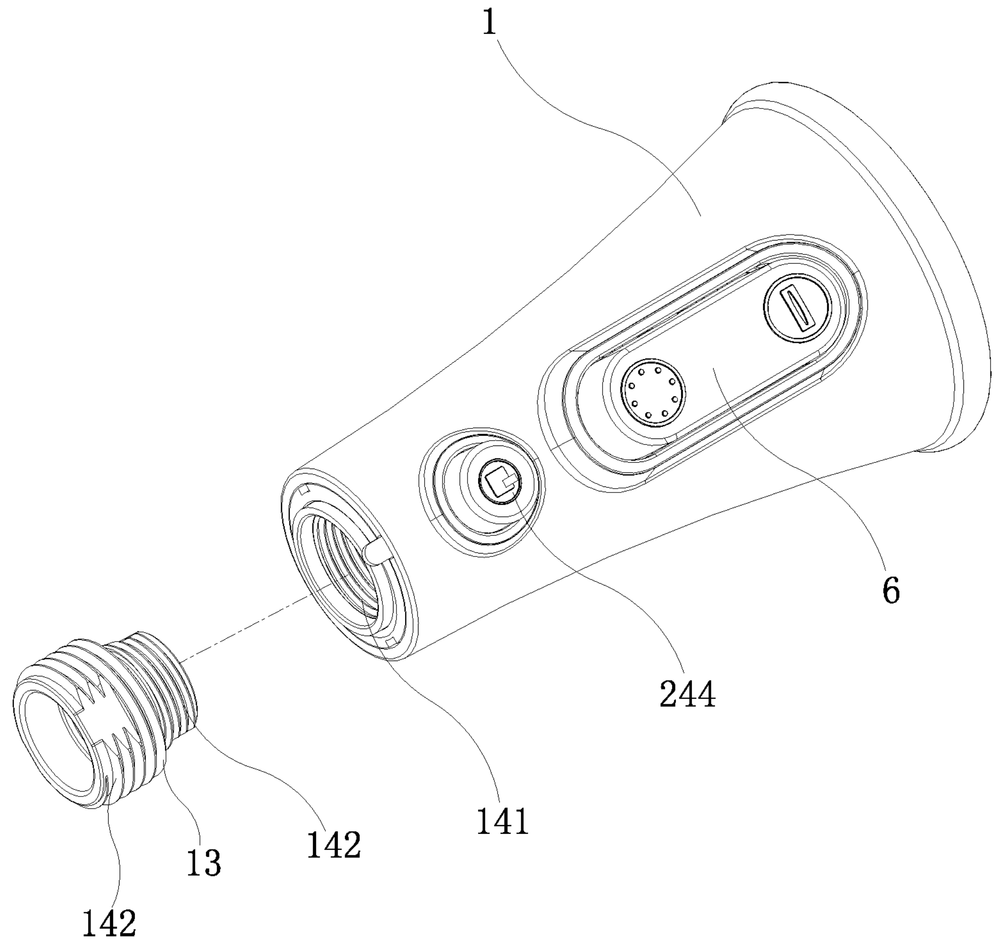
FIG. 10 is a schematic view of the third embodiment of the present invention in cooperation with a first exemplary embodiment of the inlet joint.
Figure 11:
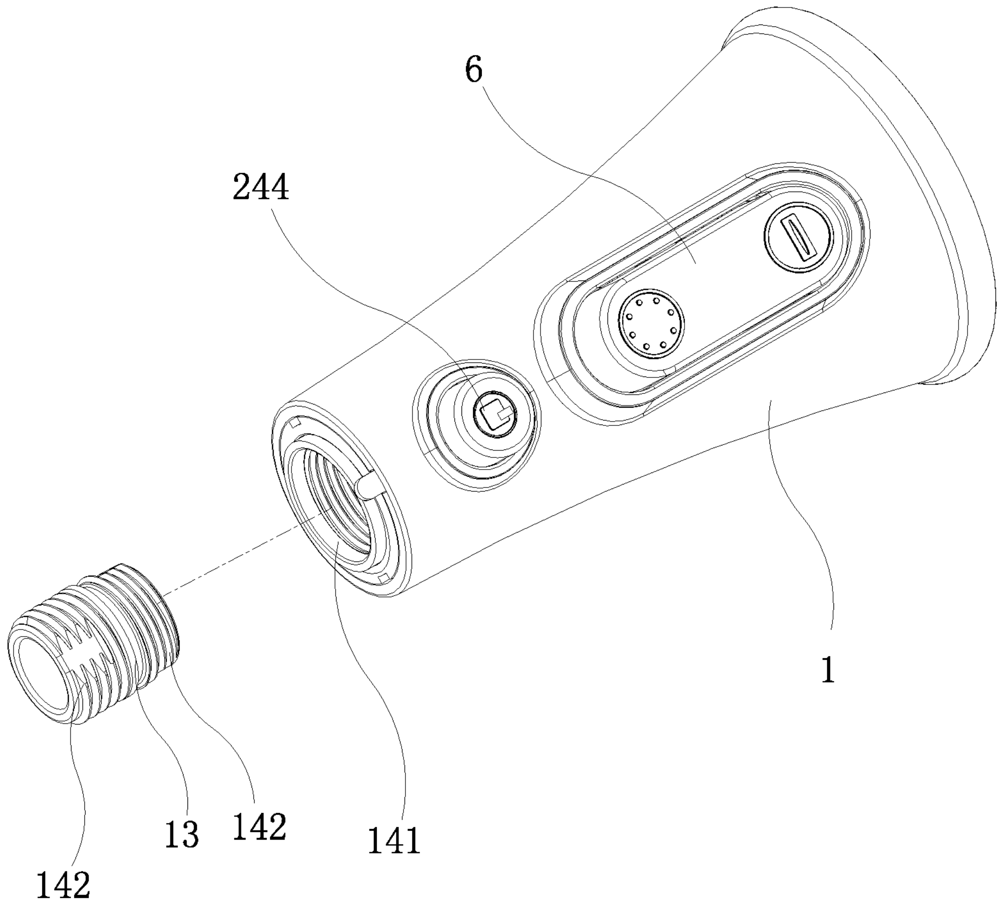
FIG. 11 is a schematic view of the third embodiment of the present invention in cooperation with a second exemplary embodiment of the inlet joint.

FIG. 7, FIG. 8 and FIG. 9 illustrate a third embodiment of the present invention. In the third embodiment of the present invention, the rubber pad 12 is connected to the inlet end 211 in a snap-fit manner. Specifically, the inlet end 211 has an engaging portion 2111, and the rubber pad 12 has an engaging groove 121. The engaging portion 2111 is engaged in the engaging groove 121. A first receiving groove 243 and a second receiving groove 244 are formed in the end face of the other end of the first inner body 2101. The first receiving groove 243 surrounds the first diversion hole 212. The second receiving groove 244 surrounds the second diversion hole 213. A first positioning ring 241 and a second positioning ring 242 protrude from the end face of the second inner body 2102, facing the first inner body 2101. The first positioning ring 241 is aligned with and received in the first receiving groove 243. The second positioning ring 242 is aligned with and received in the second receiving groove 244. Sealing rings 5 are disposed between the first positioning ring 241 and the first receiving groove 243 and between the second positioning ring 242 and the second receiving groove 244. The sealing rings 5 are O-shaped rings. Thus, the yield of the products of the present invention is improved with the above structure. In the second embodiment of the present invention, an external thread 142 of the inlet end 211 extends out of the housing 1 as a joint for connecting a pull-out tube. In the third embodiment of the present invention, as shown in FIG. 10 and FIG. 11, the external thread 142 of the inlet end 211 does not extend out of the housing 1. An internal inner thread 141 is formed in the inlet end 211, which is used for screwing the external thread 142 at one end of an inlet joint 13. The dimension of the external thread 142 at the other end of the inlet joint 13 can be of various dimensions, so that it can be standardly matched with different types of pull-out tubes in different regions. The external thread 142 of the other end of the inlet connector 13 extends out of the housing 1, so that the user can choose a suitable inlet connector 13 for connecting the pull-out tube, thereby improving the universality of the present invention.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A multi-function pull-out spray head, comprising a housing, a switching assembly and a water discharge assembly, the switching assembly being mounted in the housing, the water discharge assembly being mounted to the housing, the water discharge assembly forming at least three water outlet areas, the water discharge assembly being connected to an outlet end of the switching assembly; the switching assembly including a first inner body, a second inner body, a first switching control unit and at least two second switching control units, at least three outlet flow passages being formed inside the second inner body, the second inner body being detachably connected to the first inner body in a sealing manner, the first switching control unit controlling water to flow into the first inner body, the second switching control units each controlling water flowing into the first inner body to selectively flow out to a corresponding one of the water outlet areas along at least one of the outlet flow passages, the first inner body having a communicating flow passage made by core-pulling technology in a direction parallel to a water flowing direction; one end of the first inner body forms an inlet end, a core-pulling hole of the communicating flow passage is formed at the inlet end or at an end face of another end of the first inner body; and a sealing device is provided to always seal and block the core-pulling hole to prevent water leakage by blocking water from passing through the core-pulling hole.

2. The multi-function pull-out spray head as claimed in claim 1, wherein when the core-pulling hole is formed at the end face of said another end of the first inner body, the communicating flow passage is made by core-pulling technology along the water flowing direction, and the sealing device is a block.

3. The multi-function pull-out spray head as claimed in claim 2, wherein the number of the water outlet areas is three, the number of the second switching control units is two, the number of the outlet flow passages is three, and the second switching control units each control water flowing into the first inner body to selectively flow out to the corresponding water outlet area along one of the outlet flow passages.

4. The multi-function pull-out spray head as claimed in claim 3, wherein the end face of the another end of the first inner body is formed with a first diversion hole and a second diversion hole, a first water chamber and a second water chamber are formed in the first inner body; the first switching control unit is accommodated in the first water chamber, the inlet end communicates with the first water chamber, the first switching control unit selectively controls the second water chamber to communicate with the first water chamber, one of the second switching control units is accommodated in the second water chamber and selectively controls the second water chamber to communicate with the first diversion hole or the second diversion hole;

the water outlet areas are defined as a first water outlet area, a second water outlet area and a third water outlet area, the outlet flow passages are defined as a first outlet flow passage, a second outlet flow passage and a third outlet flow passage, the second inner body forms a third water chamber, a first inlet flow passage, the first outlet flow passage, the second outlet flow passage and the third outlet flow passage, the first inlet flow passage communicates with the third water chamber and the first diversion hole, the other second switching control unit is accommodated in the third water chamber, the first outlet flow passage communicates with the second diversion hole and the first water outlet area, the other second switching control unit selectively controls the third water chamber to communicate with the second outlet flow passage or the third outlet flow passage, the second outlet flow passage communicates with the second water outlet area, and the third outlet flow passage communicates with the third water outlet area.

5. The multi-function pull-out spray head as claimed in claim 4, wherein the water discharge assembly includes a filter screen, a rubber gasket, an aerator, a locking ring and a base, the locking ring locks the aerator to a middle portion of the base, the rubber gasket is disposed between the locking ring and the base, the base is formed with the first water outlet area and the second water outlet area, the aerator is formed with the third water outlet area, the filter screen is aligned with the first water outlet area, the filter screen is disposed between the second inner body and the base, the base is detachably connected to the second inner body, and sealing rings are disposed between the base and the second inner body and between an outlet of the first outlet flow passage and an outlet of the third outlet flow passage.

6. The multi-function pull-out spray head as claimed in claim 3, wherein the first switching control unit includes a pause fastening ring, a pause shaft, a first spring and a first button, the pause fastening ring is fixed to an upper end of the first water chamber, the pause shaft is movably inserted through the pause fastening ring to be moved up and down, one end of the first spring is accommodated in the pause shaft, another end of the first spring abuts against a bottom of the first water chamber, sealing rings are respectively disposed at a lower end of the pause shaft, between the pause shaft and the pause fastening ring and between the pause fastening ring and a wall of the first water chamber, the communicating flow passage is disposed between the first water chamber and the second water chamber, the first button cooperates with an upper end of the pause shaft, and the sealing ring at the lower end of the pause shaft selectively closes one end of the communicating flow passage located in the first water chamber, so that the first water chamber selectively communicates with the second water chamber.

7. The multi-function pull-out spray head as claimed in claim 6, wherein each of the second switching control units includes a switching shaft, a switching fastening ring, a washer, a rubber gasket and a second spring, the switching shaft is movably inserted through the switching fastening ring to be moved up and down, a protrudent ring is disposed on a circumferential wall of the switching shaft, the second spring is disposed between the protrudent ring and a lower surface of the switching fastening ring, the switching fastening ring of the one of the second switching control units is fixed to an upper end of the second water chamber, the switching fastening ring of the other second switching control units is fixed to an upper end of the third water chamber, sealing rings are disposed between the switching fastening ring of the one of the second switching control units and the second water chamber and between the switching fastening ring of the other second switching control unit and the third water chamber, the washer is disposed between the switching shaft and the switching fastening ring, the rubber gasket is fitted on the protrudent ring, a first branch flow passage is formed between the second water chamber and the first diversion hole, a second branch flow passage is formed between the second water chamber and the second diversion hole, the rubber gasket of the one of the second switching control units selectively blocks the first branch flow passage or the second branch flow passage, the rubber gasket of the other second switching control unit selectively blocks the second outlet flow passage or the third outlet flow passage.

8. The multi-function pull-out spray head as claimed in claim 7, further comprising a switching button, a first pull buckle, a second pull buckle and a third spring, a pivot seat being formed above a junction of the first inner body and the second inner body, a pivot shaft passing through the pivot seat, a protrudent portion being formed on an upper end of the switching shaft of each of the second switching control units, the third spring being disposed between the protrudent portion of the other second switching control unit and an inner wall of the switching button, one end of the first pull buckle being connected to the pivot shaft, one end of the second pull buckle being connected to the pivot shaft, a lower middle portion of the switching button being connected to the pivot shaft, the switching shafts of the second switching control units being moved up and down by the first pull buckle and the second pull buckle respectively, the switching button being linked to the first pull buckle and the second pull buckle.

9. The multi-function pull-out spray head as claimed in claim 1, wherein when the core-pulling hole is formed at the inlet end of the first inner body, the communicating flow passage is made by core-pulling technology in opposition to the water flowing direction, and the sealing device is a rubber pad.

10. The multi-function pull-out spray head as claimed in claim 9, wherein the number of the water outlet areas is three, the number of the second switching control units is two, the number of the outlet flow passages is three, and the second switching control units each control water flowing into the first inner body to selectively flow out to the corresponding water outlet area along one of the outlet flow passages.

11. The multi-function pull-out spray head as claimed in claim 10, wherein an end face of another end of the first inner body is formed with a first diversion hole and a second diversion hole, a first water chamber and a second water chamber are formed in the first inner body; the first switching control unit is accommodated in the first water chamber, the inlet end communicates with the first water chamber, the first switching control unit selectively controls the second water chamber to communicate with the first water chamber, one of the second switching control units is accommodated in the second water chamber and selectively controls the second water chamber to communicate with the first diversion hole or the second diversion hole;

the water outlet areas are defined as a first water outlet area, a second water outlet area and a third water outlet area, the outlet flow passages are defined as a first outlet flow passage, a second outlet flow passage and a third outlet flow passage, the second inner body forms a third water chamber, a first inlet flow passage, the first outlet flow passage, the second outlet flow passage and the third outlet flow passage, the first inlet flow passage communicates with the third water chamber and the first diversion hole, the other second switching control unit is accommodated in the third water chamber, the first outlet flow passage communicates with the second diversion hole and the first water outlet area, the other second switching control unit selectively controls the third water chamber to communicate with the second outlet flow passage or the third outlet flow passage, the second outlet flow passage communicates with the second water outlet area, and the third outlet flow passage communicates with the third water outlet area.

12. The multi-function pull-out spray head as claimed in claim 11, wherein the water discharge assembly includes a filter screen, a rubber gasket, an aerator, a locking ring and a base, the locking ring locks the aerator to a middle portion of the base, the rubber gasket is disposed between the locking ring and the base, the base is formed with the first water outlet area and the second water outlet area, the aerator is formed with the third water outlet area, the filter screen is aligned with the first water outlet area, the filter screen is disposed between the second inner body and the base, the base is detachably connected to the second inner body, and sealing rings are disposed between the base and the second inner body and between an outlet of the first outlet flow passage and an outlet of the third outlet flow passage.

13. The multi-function pull-out spray head as claimed in claim 11, wherein a first receiving groove and a second receiving groove are formed in the end face of the another end of the first inner body, the first receiving groove surrounds the first diversion hole, the second receiving groove surrounds the second diversion hole, a first positioning ring and a second positioning ring protrude from an end face of the second inner body, facing the first inner body, the first positioning ring is aligned with and received in the first receiving groove, the second positioning ring is aligned with and received in the second receiving groove, sealing rings are disposed between the first positioning ring and the first receiving groove and between the second positioning ring and the second receiving groove, and the sealing rings are O-shaped rings.

14. The multi-function pull-out spray head as claimed in claim 10, wherein the first switching control unit includes a pause fastening ring, a pause shaft, a first spring and a first button, the pause fastening ring is fixed to an upper end of the first water chamber, the pause shaft is movably inserted through the pause fastening ring to be moved up and down, one end of the first spring is accommodated in the pause shaft, another end of the first spring abuts against a bottom of the first water chamber, sealing rings are respectively disposed at a lower end of the pause shaft, between the pause shaft and the pause fastening ring and between the pause fastening ring and a wall of the first water chamber, the communicating flow passage is disposed between the first water chamber and the second water chamber, the first button cooperates with an upper end of the pause shaft, and the sealing ring at the lower end of the pause shaft selectively closes one end of the communicating flow passage located in the first water chamber, so that the first water chamber selectively communicates with the second water chamber.

15. The multi-function pull-out spray head as claimed in claim 14, wherein each of the second switching control units includes a switching shaft, a switching fastening ring, a washer, a rubber gasket and a second spring, the switching shaft is movably inserted through the switching fastening ring to be moved up and down, a protrudent ring is disposed on a circumferential wall of the switching shaft, the second spring is disposed between the protrudent ring and a lower surface of the switching fastening ring, the switching fastening ring of the one of the second switching control units is fixed to an upper end of the second water chamber, the switching fastening ring of the other second switching control units is fixed to an upper end of the third water chamber, sealing rings are disposed between the switching fastening ring of the one of the second switching control units and the second water chamber and between the switching fastening ring of the other second switching control unit and the third water chamber, the washer is disposed between the switching shaft and the switching fastening ring, the rubber gasket is fitted on the protrudent ring, a first branch flow passage is formed between the second water chamber and the first diversion hole, a second branch flow passage is formed between the second water chamber and the second diversion hole, the rubber gasket of the one of the second switching control units selectively blocks the first branch flow passage or the second branch flow passage, the rubber gasket of the other second switching control unit selectively blocks the second outlet flow passage or the third outlet flow passage.

16. The multi-function pull-out spray head as claimed in claim 15, further comprising a switching button, a first pull buckle, a second pull buckle and a third spring, a pivot seat being formed above a junction of the first inner body and the second inner body, a pivot shaft passing through the pivot seat, a protrudent portion being formed on an upper end of the switching shaft of each of the second switching control units, the third spring being disposed between the protrudent portion of the other second switching control unit and an inner wall of the switching button, one end of the first pull buckle being connected to the pivot shaft, one end of the second pull buckle being connected to the pivot shaft, a lower middle portion of the switching button being connected to the pivot shaft, the switching shafts of the second switching control units being moved up and down by the first pull buckle and the second pull buckle respectively, the switching button being linked to the first pull buckle and the second pull buckle.

17. The multi-function pull-out spray head as claimed in claim 9, wherein a one-way valve is accommodated in the inlet end, and the one-way valve holds the rubber pad.

18. The multi-function pull-out spray head as claimed in claim 9, wherein the rubber pad is connected to the inlet end in a snap-fit manner.

19. The multi-function pull-out spray head as claimed in claim 1, wherein when the core-pulling hole is formed at the inlet end of the first inner body, the communicating flow passage is made by core-pulling technology in opposition to the water flowing direction, and the sealing device is a rubber pad, the inlet end of the first body has an engaging portion, the rubber pad has an engaging groove, and the engaging portion is engaged in the engaging groove.

20. The multi-function pull-out spray head as claimed in claim 1, wherein a sealing ring is disposed between the first inner body and the second inner body, and the first inner body and the second inner body are connected together with screws.

* * * * *